United States Patent Office 3,119,828
Patented Jan. 28, 1964

---

3,119,828
PROCESS FOR THE PRODUCTION OF ALKENYL-PYRIDINES AND CATALYST THEREFOR
Jean Herzenberg, Guidobaldo Cevidalli, and Adriano Nenz, all of Milan, Italy, assignors to Sicedison S.p.A., Milan, Italy
No Drawing. Filed Aug. 11, 1959, Ser. No. 832,894
Claims priority, application Italy Oct. 14, 1958
2 Claims. (Cl. 260—290)

The present invention relates to a process for the production of alkenyl-pyridines and particularly to a process wherein special catalysts are used.

As already known, a dehydrogenation reaction of alkyl-pyridines for the production of alkenyl-pyridines is carried out by conducting alkyl-pyridine vapors, suitably diluted with inert gases or steam, over a solid catalyst, at temperatures ranging from 550° C. to 700° C. Under such conditions, the dehydrogenation reaciton is associated with dealkylation and isomerization reactions, as well as with other secondary reactions by which the starting material is broken down and there is obtained in addition to the desired main product, lower boiling alkyl-pyridines and gaseous by products, with the added drawback of the formation of carbon products which contaminate the catalyst. Following known procedures there is a relatively low yield of the desired product, together with a swift and progressive inhibition of the catalyst.

It is an object of the present invention to provide a process for the production of alkenyl-pyridines by the dehydrogenation of alkyl-pyridines in the gaseous phase, by means of a solid catalyst.

A further object of the invention consists in the production of alkenyl-pyridines by the dehydrogenation of alkyl-pyridines with high conversion rates.

A further object of the invention consists in suppressing the formation of byproducts as, for example, the dealkylation products in a dehydrogenation process converting alkyl-pyridines into alkenyl-pyridines thereby insuring the efficient and profitable operation of the process.

Further advantages to be realized by the means and method according to the present invention will become apparent from the following description.

According to the present invention, all pyridine homologues having one or more ethyl, propyl, or butyl groups, which may be further substituted, in the second, third, fourth, fifth, or sixth positions of the pyridine ring, may be dehydrogenated, with good yields, to form alkenyl-pyridines. It has hitherto been known that 2-methyl-5-ethyl pyridine can be dehydrogenated to 2-methyl-5-vinyl pyridine by the use of iron oxides, as catalysts together with small amounts of alkali and chromium oxides. It has been found that using oxides of metals according to the second group, second subgroup, of the periodic system, and particularly zinc oxide, as the essential part of the catalyst, highly active catalysts can be obtained, permitting operation at lower temperatures, with high specific yields of methyl-vinyl-pyridine per volume unit of catalyst. Even better results have been obtained with a catalyst prepared with the addition of small amounts of $Al_2O_3$, CaO, $K_2O$ and $Cr_2O_3$, to zinc oxide-iron oxide mixtures. Such catalysts are highly selective, in that the dehydrogenation reaction will predominate over the dealkylation reaction, and the undesired further secondary reactions.

Good results have been obtained, for example, from a catalyst composed of ZnO 50–80 percent, $Fe_2O_3$ 10–30 percent, CaO 1–15 percent, $Al_2O_3$ 5–10 percent, $K_2O$ 1–5 percent, and $Cr_2O_3$ 0.5–2 percent. The catalyst may be readily prepared in the conventional manner, that is, by employing pure zinc and calcium oxides mixed with $Al(OH)_3$, $Cr(OH)_3$ and $Fe(OH)_3$, co-precipitated from their sulfates by the action of $NH_3$. To the composition thus obtained, there may be added a concentrated KOH solution, and the product finally submitted to an oven-drying operation until the consistency required for extrusion has been attained. The extruded rods are cut into small cylinders and oven-dried at temperatures ranging from 700°–750° C. in a stream of nitrogen. The latter operation is particularly important in the preparation of the catalyst suitable for the operation of the process according to the present invention. However, recourse may also be had to other methods for the preparation of the catalyst. It is found that the presence of zinc oxide results in the dehydrogenation reaction being made more selective, thereby making possible a high yield also at lower temperatures, and facilitating operation at a higher space velocity of the reagents. The presence of CaO and $K_2O$ markedly promotes the water gas reaction, thereby preventing the precipitation of carbon onto the catalyst, the activity whereof is thus kept constant for a longer period of time. The activity of the catalyst is materially increased by the presence of iron, aluminium and chromium oxides in the above-stated proportions.

In the technical operation of the process, the product to be dehydrogenated may be suitably diluted before the start of the reaction, with an inert gas or steam. The use of steam is beneficial in that, due to its high specific heat; it exerts a temperature stabilizing action in the different parts of the catalyst, thereby protecting the organic molecule from secondary reactions. Moreover, the presence of steam has the desirable effect of decreasing the partial pressure of the substance to be dehydrogenated thereby shifting the thermo-dynamic balance of the reaction in the required direction. Further, a chemical action is exerted by the steam on any possibly occurring tarry residues, which otherwise would tend to deposit onto the catalyst, whereby they are converted into carbon dioxide and hydrogen, thus materially extending the active life of the catalyst. In this respect it has been found that the catalyst should be characterized by a specific activity in promoting the reaction, whereby the tarry residues are converted into carbon dioxide and hydrogen, extending the life of the catalyst for the dehydrogenation reaction. The catalysts used in the process according to the present invention, displays these desirable features and, as will hereinafter be shown (note Example III), an amount of water only two or three times greater by weight than the alkyl-pyridine, is sufficient to obtain a very good activity and selectivity of the catalyst without necessity of employing greater dilutions.

According to the present invention, the dehydrogenation can be carried out in a temperature range of 500° C. to 800° C., preferably 550° C. to 650° C. In order to prevent secondary reactions, it is found to be advantageous to employ steam which has been first superheated up to a temperature in the range of substantially 700° C. to 850° C., the alkyl-pyridine vapors being introduced into the catalyst zone without any overheating. For instance in the temperature zone: 550°–620° C., the catalyst will show a sufficiently high dehydrogenating activity and at the same time strongly restrains secondary reactions. Moreover, at the same temperatures a considerable oxidizing action is exerted by the steam on the carbon formations, to the extent that no traces of carbon may be found on the catalyst even after many hundred hours of operation.

The space velocities, expressed as units of gas volume, taken at 0° C. and 760 mm. Hg., that flow across a volume unit of catalyst per hour, adopted in this process for the mixture of alkyl-pyridine and steam, range between 5,000 and 20,000 volume units per volume unit of catalyst, per hour, which corresponds to an unusually high production of alkenyl-pyridine per volume unit of catalyst.

In order that the process according to the present invention may be fully understood, the following detailed examples are given. In these examples three types of catalysts are specified, and for each the results are set forth operating under different specific operating conditions. It will be noted that the basic components, zinc oxide and iron oxide, are present in all of the catalysts used and that the presence and the amounts of activators differ in the several examples. The influence exerted by the said activators on the activity and the selectivity of the catalysts, will be readily appreciated by those skilled in the art. Following the present description, further possibilities of variation will become apparent to those skilled in the art.

It is understood that, following the present description, these examples are only of an illustrating and not limiting purpose.

EXAMPLE I

(a) Preparation of Catalyst

Pure ZnO in the amount of 800 grams is mixed with an aqueous solution containing 14 grams of KOH, forming thereby a mixture of pasty consistency. To this mixture there is added a precipitate containing $Fe(OH)_3$ and $Cr(OH)_3$ obtaining by treating a solution containing 630 grams of $Fe_2(SO_4)_3 \cdot 9H_2O$ and 34.8 grams $$Cr_2(SO_4)_3 \cdot 15H_2O$$

with $NH_3$. This precipitate is washed thoroughly in order to remove $SO_4$ ions. The thus obtained composition is dried at 120° C. until a consistency is attained suitable for extrusion, and same is thereafter extruded through a die having a hole of 3 mm. diameter. The extruded rods are then further dried at 120° C., cut into short sections, and finally burnt at 750° C. in a nitrogen stream, for 10 hours in a small furnace. By the foregoing procedure there is obtained approximately one kilogram of catalyst having the following composition:

| | Percent |
|---|---|
| ZnO | 80 |
| $Fe_2O_3$ | 18 |
| $K_2O$ | 1.2 |
| $Cr_2O_3$ | .8 |

(b) Dehydrogenation 320 grams of the catalyst, prepared as above described, is introduced into stainless steel reactor tube (V4A, 35 mm. diameter) wherein the volume occupied by the catalyst will be about 240 cu. cm. The catalyst-loaded reactor tube is heated in an electric muffle furnace up to reaction temperature. Steam, superheated in another electric furnace to a temperature up to about 700° C., together with 2-methyl-5-ethyl pyridine vaporized in a small separate vaporizer, is introduced into the reactor tube and held at reaction temperature as hereinafter specified with a variation of plus or minus 1 or 2 degrees C.

In the subjoined table there are set forth the operating conditions and results corresponding to two runs, one being at a dehydrogenation temperature of 580° C. and the other at a temperature of 600° C. The vapors discharged from the reactor tube are condensed in a high efficiency water condenser and the resulting liquid is submitted to a de-gasing operation in a degasifier connected with a gas meter. The raw reaction product forms two layers: the upper organic rich layer having a water content of 18–19 percent, and a lower aqueous layer containing up to 2 percent of pyridine bases. The upper or organic phase is separated, subjected to dehydration and admixed with the chloromethylen extract obtained from the aqueous phase, and distilled in a suitable distillation column. The obtained fractions are analyzed. The gases obtained in the dehydrogenation run are also measured and analyzed. The results, tabulated below, have been obtained from an average sample of reaction products, the test in each case representing a 24 hour run.

| | 1st Test | 2d Test |
|---|---|---|
| Dehydrogenation temperature, °C | 580 | 600 |
| Weight of catalyst, grams | 320 | 318 |
| Volume of catalyst, cu. cm | 240 | 240 |
| Weight feed rate of MEP, grams/hr | 303 | 303 |
| Weight feed rate of $H_2O$, grams/hr | 2,000 | 2,090 |
| Mole ratio water/MEP | 44.4 | 46.2 |
| Weight ratio water/MEP | 6.6 | 6.9 |
| Space velocity (v./v./h.): | | |
|   MEP gas (0° C. and 760 mm. Hg) | 230 | 230 |
|   $H_2O$ gas (0° C. and 760 mm. Hg) | 10,400 | 10,400 |
|   MEP liquid | 1.35 | 1.37 |
|   $H_2O$ liquid | 8.37 | 8.35 |
| Vol. of obtained gases: l./hr. at 0° C. and 760 mm. Hg | 53 | 82 |
| Balance of materials, percent | 98.8 | 97.4 |
| Conversion (percent mol) | 37.8 | 53.1 |
| Per pass yield of MVP (percent mol, mol of fed MEP) | 31.8 | 42.0 |
| Ultimate yield of MVP (mol percent, mol of converted MEP) | 84.2 | 79.2 |
| Yield of "Low Boiling"[1] (average M.W.=110) (mol percent, mol of converted MEP) | 7.8 | 10.5 |
| Yield of "High Boiling" (percent g., g. of converted MEP) | .2 | .2 |
| Yield of carbon in the gases (percent g., g. of converted MEP) | 4.7 | 6.8 |
| Analysis of gases (vol. percent): | | |
|   CO | .9 | 1.0 |
|   $CO_2$ | 15.2 | 17.6 |
|   $CH_4$ | 2.5 | 1.8 |
|   $C_2H_4$ and higher | .8 | .8 |
|   $N_2$ | 2.2 | 3.0 |
|   $H_2$ | 78.4 | 75.8 |

[1] For the terms "Low Boiling" and "High Boiling" see explication, column 5.

EXAMPLE II

(a) Preparation of Catalyst

A catalyst is prepared similarly to Example I, with the only difference that a mixture of CaO and ZnO is added to the iron and chromium hydrates. The composition of the catalyst thus prepared is as follows:

| | Percent |
|---|---|
| ZnO | 76 |
| $Fe_2O_3$ | 18 |
| CaO | 4 |
| $K_2O$ | 1.2 |
| $Cr_2O_3$ | .8 |

The calcium oxide serves to decrease the tendency of the catalyst to produce secondary reaction, i.e. to increase the selectivity toward the desired dehydrogenation reaction.

(b) Dehydrogenation 290 grams of the catalyst prepared as above described are introduced into the stainless steel reactor tube described in Example I, and the tests are run under the same conditions therein set forth, 2-methyl-5-ethyl pyridine being the material subjected to dehydrogenation.

In the subjoined table there are set forth the operating conditions and results corresponding to two runs, each for 24 hours.

| | 1st Test | 2d Test |
|---|---|---|
| Dehydrogenation temperature, ° C | 600 | 600 |
| Volume of catalyst, cu. cm | 240 | 240 |
| Weight of catalyst, grams | 290 | 284 |
| Weight feed rate of MEP, grams/hr | 305 | 159 |
| Weight feed rate of $H_2O$, grams/hr | 2,090 | 1,060 |
| Molar ratio $H_2O$/MEP | 46.0 | 44.8 |
| Weight ratio $H_2O$/MEP | 6.85 | 6.66 |
| Space velocity (v./v./hr.): | | |
|   MEP gas (0° C. and 760 mm. Hg) | 235 | 122 |
|   $H_2O$ gas (0° C. and 760 mm. Hg) | 10,800 | 5,500 |
|   MEP, liquid | 1.38 | .72 |
|   $H_2O$, liquid | 8.7 | 4.42 |
| Balance of materials, percent | 97.8 | 99.0 |
| Conversion (percent, mol) | 41.8 | 60.6 |
| Per pass yield of MVP (percent mol, mol of fed MEP) | 37.1 | 51.0 |
| Ultimate yield of MVP (percent mol, mol of converted MEP) | 90.3 | 84.0 |
| Ultimate yield of "Low Boiling" (average M.W.=110) (percent mol, mol of converted MEP) | 4.2 | 7.5 |
| Ultimate yield of "High Boiling" (percent g., g. of converted MEP) | .6 | .6 |
| Volume of obtained gases (0° C. and 760 mm. Hg) l./hr. | 51 | 49 |
| Yield of carbon in the gases (percent g., g. of converted MEP) | 4.1 | 5.4 |
| Analysis of gases (vol. percent): | | |
|   CO | .7 | 1.1 |
|   $CO_2$ | 13.2 | 15.9 |
|   $CH_4$ | 3.5 | 2.4 |
|   $C_2H_4$ and higher | 1.0 | 1.1 |
|   $N_2$ | 3.5 | 3.0 |
|   $H_2$ | 78.1 | 76.5 |

EXAMPLE III

(a) Preparation of Catalyst 600 grams of pure ZnO and 140 grams of pure CaO are mixed with the precipitate obtained as set forth in Example I, starting from a solution of 530 grams $Fe_2(SO_4)_3 \cdot 9H_2O$, 520 grams of $Al_2(SO_4)_3 \cdot 18H_2O$, and 35 grams of $Cr_2(SO_4)_3 \cdot 15H_2O$. The composition as obtained after the addition of a saturated solution of KOH, containing 26 grams of KOH, is extruded as described in Example I. By this procedure there is obtained approximately 1 kilogram of catalyst having the following composition.

| | Percent |
|---|---|
| ZnO | 60 |
| $Fe_2O_3$ | 15 |
| CaO | 14 |
| $Al_2O_3$ | 8 |
| $K_2O$ | 2.2 |
| $Cr_2O_3$ | .8 |

(b) Dehydrogenation 200 grams of the catalyst above described is subjected to dehydrogenation tests carried out as in Examples I and II, 2-methyl-5-ethyl-pyridine being the substance subjected to dehydrogenation. The results obtained at different temperatures are set forth in the subjoined tabulation.

| | 1st Test | 2d Test | 3d Test | 4th Test | 5th Test |
|---|---|---|---|---|---|
| Dehydrogenation temp., °C | 600 | 600 | 610 | 630 | 660 |
| Volume of catalyst, cu. cm | 240 | 240 | 180 | 240 | 240 |
| Weight of catalyst, grams | 202 | 208 | 155 | 210 | 212 |
| Weight feed rate of MEP, grams/hr | 158.4 | 309.6 | 298 | 567 | 545 |
| Weight feed rate of $H_2O$, grams/hr | 1,052 | 2,025 | 1,550 | 1,983 | 2,130 |
| Molar ratio $H_2O$/MEP | 44.7 | 44 | 35 | 23.5 | 26.2 |
| Weight ratio $H_2O$/MEP | 6.65 | 6.58 | 5.17 | 3.5 | 3.91 |
| Space velocity v./hr: | | | | | |
| MEP gas (0°C., 760 mm.) | 122.2 | 238.4 | 306 | 437 | 420 |
| $H_2O$ gas (0°C., 760 mm.) | 5,464 | 10,500 | 10,700 | 10,280 | 11,013 |
| MEP liquid | .716 | 1.4 | 1.8 | 2.57 | 2.47 |
| $H_2O$ liquid | 4.39 | 8.44 | 8.62 | 8.27 | 8.87 |
| Balance of materials, percent | 97.9 | 99.4 | 99.2 | 98.00 | 99.8 |
| Conversion (percent, mol) | 65.0 | 53.1 | 52.0 | 52.2 | 73.0 |
| Per pass yield of MVP (percent mol, mol of fed MEP) | 53.3 | 45.6 | 45.9 | 44.1 | 54.4 |
| Ultimate yield of MVP (percent mol, mol of converted MEP) | 82.0 | 86.0 | 88.3 | 84.5 | 74.5 |
| Yield of "Low Boiling" (average M.P.=110) (percent mol, mol of converted MEP) | 5.5 | 8.1 | 9.3 | 7.0 | 12.6 |
| Ultimate yield of "High Boiling" (percent g., g. of converted MEP) | .2 | .6 | .5 | .6 | 1.1 |
| Volume of obtained gases l./hr. (at 0°C. and 760 mm. Hg) | 48.5 | 69 | 71 | 182 | 352 |
| Yield of carbon in the gases (percent g., g. of converted MEP) | 5.5 | 4.2 | 5.0 | 7.2 | 12.1 |
| Analysis of gases (vol, percent): | | | | | |
| CO | 1 | 1.4 | .8 | .9 | 1.4 |
| $CO_2$ | 16.1 | 14.5 | 15.2 | 17.6 | 19.8 |
| $CH_4$ | 3.9 | 2.7 | 3.5 | 3.1 | 2 |
| $C_2H_4$ and higher | .7 | .6 | .4 | .4 | 1 |
| $N_2$ | 2.8 | 4 | 2.5 | 4 | 2.6 |
| $H_2$ | 75.4 | 76.8 | 77.8 | 72 | 73.2 |

In the dehydrogenation examples as noted above, all products with a boiling point lower than that of methyl-ethyl-pyridine have been tabulated under the heading "Low Boiling." These products include pyridine, alpha-picoline, beta-picoline, 3-ethyl pyridine, and 2,5-dimethyl pyridine.

EXAMPLE IV

Dehydrogenation of 4-ethyl-pyridine is carried out employing the same catalyst as in Example III under two different sets of conditions. The operating conditions and the results obtained are tabulated below.

The byproducts obtained from the dehydrogenation of 4-ethyl pyridine to 4-vinyl-pyridine, which in the table below are shown by the designation: "Low Boiling," consist of small amounts of pyridine and gamma-picoline, for which an average molecular weight of 91 has been assumed.

| | 1st Test | 2d Test |
|---|---|---|
| Dehydrogenation temperature, °C | 600 | 620 |
| Volume of catalyst, cu. cm | 240 | 160 |
| Weight of catalyst, grams | 210 | 147 |
| Weight feed rate of 4-ethyl-pyridine, grams/hr | 140.3 | 182.8 |
| Weight feed rate of $H_2O$, grams/hr | 1,062 | 1,383 |
| Molar ratio $H_2O$/4-ethyl-pyridine | 45 | 45 |
| Weight ratio $H_2O$/4-ethyl-pyridine | 7.57 | 7.57 |
| Space velocity (v./v./hr.): | | |
| 4-ethyl-pyridine (gas) (at 0°C. and 760 mm. Hg) | 122.5 | 239.1 |
| $H_2O$ (gas) (at 0°C. and 760 mm. Hg) | 5,506 | 10,752 |
| 4-ethyl-pyridine (liquid) | .584 | 1.142 |
| $H_2O$ (liquid) | 4.425 | 8.64 |
| Balance of materials, percent | 100 | 100 |
| Conversion (percent, mol) | 49.9 | 37 |
| Per pass yield of 4-vinyl pyridine (percent mol, mol of fed 4-ethyl-pyridine) | 32.1 | 31.2 |
| Ultimate yield of 4-vinyl-pyridine (percent mol, mol of converted 4-ethyl-pyridine) | 64.3 | 84.3 |
| Ultimate yield of "low boiling" (average M.W.=91) (percent mol, mol of converted 4-ethyl-pyridine) | 26.4 | 10.7 |
| Ultimate yield of "high boiling" (percent g., g. of converted ethyl-pyridine) | .1 | .1 |
| Volume of obtained gases l./hr. (0°C. and 760 mm. Hg) | 41.6 | 29.2 |
| Cracked 4-ethyl-pyridine (percent mol, mol of converted 4-ethyl-pyridine) | 9.2 | 4.9 |
| Analysis of gases (vol. percent): | | |
| CO | 1.4 | 1 |
| $CO_2$ | 17.2 | 10.4 |
| $CH_4$ | 1.8 | 2 |
| $C_2H_4$ and higher | 1.2 | 1 |
| $N_2$ | 5.4 | 8 |
| $H_2$ | 72.6 | 76.8 |

EXAMPLE V

Dehydrogenation of 4-methyl-5-ethyl-pyridine, more generally known as beta collidine, is carried out employing a catalyst similar to that described in Example III, under conditions set forth in the subjoined table, together with the obtained results. The byproducts that are formed by the dehydrogenation, whereby there is formed 4-methyl-5-vinyl-pyridine, consist of gamma-picoline, 4,5-dimethyl-pyridine, 3-vinyl-pyridine and 3-ethyl-pyridine. These byproducts are indicated by the title "Low Boiling," for which an average molecular weight of 110 has been assumed.

| | |
|---|---|
| Dehydrogenation temperature °C | 600 |
| Volume of catalyst cu. cm | 240 |
| Weight of catalyst grams | 210 |
| Weight feed rate of beta-collidine grams/hr | 162.3 |
| Weight feed rate of $H_2O$ do | 1,100 |
| Molar ratio $H_2O$/beta-collidine | 45.4 |
| Weight ratio $H_2O$/beta-collidine | 6.79 |
| Space velocity (v./v./hr.): | |
| Beta-collidine (gas) at 0°C. and 760 mm. Hg | 125.2 |
| $H_2O$ (gas) (at 0°C. and 760 mm. Hg) | 5,700 |
| Balance of material percent | 98.4 |
| Conversion (percent mol.) | 58 |
| Per pass yield of 4-methyl-5'-vinyl pyridine (percent mol, mol of converted beta-collidine) percent | 45.5 |
| Ultimate yield of 4 - methyl - 5 - vinyl pyridine (percent mol, mol of converted beta-collidine) percent | 78.5 |
| Ultimate yield of "Low Boiling" (average M.W. =110) (percent mol; mol of converted beta-collidine) percent | 10.7 |
| Ultimate yield of "High Boiling" (percent g., g. of converted beta-collidine) percent | .4 |
| Volume of obtained gases l./hr. (at 0°C. and 760 mm. Hg) | 43.2 |
| Analysis of gases (vol., percent): | |
| CO | 1.2 |
| $CO_2$ | 19.1 |
| $CH_4$ | 2.7 |
| $C_2H_4$ and higher | .9 |
| $N_2$ | 3.5 |
| $H_2$ | 72.6 |

In case other alkyl-pyridines containing at least one alkyl group with two or more carbon atoms substituted for a hydrogen atom in the ring, as e.g. 2-ethyl-pyridine, 3-ethyl-pyridine, 2-methyl-5-propyl-pyridine, 2,4-diethyl-pyridine, 2,5-diethyl-pyridine, are utilized in place of 4-ethyl-pyridine, 2-methyl-5-ethyl-pyridine and 4-methyl-5-ethyl-pyridine in the above specified processes, and with one of the above-stated catalysts, without making any change thereto, high yields of the corresponding vinyl derivatives are obtained.

It will be understood that the foregoing description is to be interpreted as illustrative of the invention and not in a limiting sense.

What is claimed is:

1. A process for the production of alkenyl-pyridine from alkyl-pyridine comprising: subjecting a vaporized mixture, heated to a temperature ranging from 500° C. to 800° C., of alkyl-pyridine and steam, to dehydrogenation in the presence of a catalyst, consisting of zinc oxide in amount ranging from 50 to 80 percent, iron oxide in amount ranging from 10 to 30 percent, chromium oxide in amount ranging from 0.5 to 2 percent, an alkali metal oxide in amount ranging from 1 to 5 percent, calcium oxide in amount ranging from 1 to 15 percent, and aluminum oxide in amount ranging from 5 to 10 percent, said percentages being referred to the dry weight of the total amount of said catalyst.

2. A process for the production of alkenyl-pyridine from alkyl-pyridine comprising: subjecting a vaporized mixture, heated to a temperature ranging from 500° C. to 800° C., of alkyl-substituted pyridine selected from the class consisting of 2-ethyl-pyridine, 3-ethyl-pyridine, 4-ethyl-pyridine, 2-methyl-5-ethyl-pyridine, 4-methyl-5-ethyl-pyridine, 2,4-diethyl-pyridine, 2,5-diethyl-pyridine and 2-methyl-5-propyl-pyridine, and steam, to dehydrogenation in the presence of a catalyst consisting of: zinc oxide in amount ranging from 50 to 80 percent, iron oxide in amount ranging from 10 to 30 percent, chromium oxide in amount ranging from 0.5 to 2 percent, an alkali metal oxide in amount ranging from 1 to 5 percent, calcium oxide in amount ranging from 1 to 15 percent, and aluminum oxide in amount ranging from 5 to 10 percent, said percentages being referred to the dry weight of the total amount of said catalyst.

References Cited in the file of this patent
UNITED STATES PATENTS

| | | |
|---|---|---|
| 2,611,769 | Hays | Sept. 23, 1952 |
| 2,716,119 | Cislak | Aug. 23, 1955 |
| 2,728,770 | Mahan | Dec. 27, 1955 |
| 2,732,376 | Wagner | Jan. 24, 1956 |
| 2,769,811 | Mahan | Nov. 6, 1956 |
| 2,866,790 | Pitzer | Dec. 30, 1958 |
| 2,888,499 | Pitzer et al. | May 26, 1959 |
| 2,908,655 | Keith | Oct. 13, 1959 |

OTHER REFERENCES

Shuikin et al.: Chem. Abstracts, vol. 47, col. 6234 (1953).

Gusev et al.: Chem. Abstracts, vol. 49, col. 8584 (1955).

Sakuyama et al.: Chem. Abstracts, vol. 52, col 4069 (1958).